（12）United States Patent
Richards (10) Patent No.: US 6,250,005 B1
(45) Date of Patent: *Jun. 26, 2001

(54) REMOVABLE DISPLAY SURFACE (76) Inventor: Eric W. Richards, 3304 - 129th Way SE., Auburn, WA (US) 98092

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,749

(22) Filed: Jul. 21, 1997

(51) Int. Cl.[7] .............. B65D 25/34; B65D 65/08
(52) U.S. Cl. ................ 40/665; 40/306; 150/901; 215/12.1
(58) Field of Search ................ 40/306, 310, 665, 40/630, 675; 215/12.1, 12.2, 13.1, 392, 394; 150/901; 283/81

(56) References Cited

U.S. PATENT DOCUMENTS

| | | | | |
|---|---|---|---|---|
| 587,312 | * | 8/1897 | Ives ........................... | 40/665 |
| 1,632,347 | * | 6/1927 | Pipkin .................... | 215/394 X |
| 1,647,169 | * | 11/1927 | Anton ..................... | 150/901 X |
| 2,081,152 | * | 5/1937 | Replogle et al. .............. | 215/12.1 X |
| 2,123,610 | * | 7/1938 | Neher ..................... | 40/310 |
| 2,127,342 | * | 8/1938 | Neher ..................... | 40/310 |
| 2,240,072 | * | 4/1941 | Hodgdon et al. ............ | 40/675 X |
| 2,376,194 | | 5/1945 | Samuels .................. | 215/12.1 X |
| 2,384,274 | * | 9/1945 | Bean ...................... | 40/661.04 |
| 2,409,820 | | 10/1946 | Zimmern ................. | 215/12.1 |
| 2,490,250 | | 12/1949 | Boener ................... | 150/52 |
| 2,745,569 | * | 5/1956 | Seaman .................. | 215/12.1 X |
| 3,092,277 | * | 6/1963 | Brim ..................... | 215/12.1 |
| 3,680,726 | * | 8/1972 | Massey .................. | 215/12.2 |
| 3,760,968 | | 9/1973 | Amberg et al. ........... | 215/12 |
| 3,826,026 | * | 7/1974 | Bevan ................... | 40/644 |
| 3,829,348 | | 8/1974 | Spiegel et al. ........... | 161/16 |
| 3,941,159 | * | 3/1976 | Toll ...................... | 138/147 |
| 3,967,993 | | 7/1976 | Isomi .................... | 156/86 |
| 3,967,995 | | 7/1976 | Fabianic ................ | 156/86 |
| 4,181,765 | * | 1/1980 | Harmony ............... | 150/901 X |
| 4,190,168 | | 2/1980 | Jacques ................ | 215/12 R |

(List continued on next page.)

OTHER PUBLICATIONS

Journal of AMA, vol. 168, No. 7. "Self–Adhering Nylon Tapes". Maurice Gershman, M.D. Oct. 1958.

*Primary Examiner*—Anthony Knight
*Assistant Examiner*—Robert G. Santos
(74) *Attorney, Agent, or Firm*—Patrick M. Dwyer (57) ABSTRACT

A precisely measured removable cover for reusable beverage containers. A covering of independently resilient material is precisely cut to fit a given size and shape of pot, and the material has imprinted on it a desired promotional or advertising message and/or graphics. The covering material is removably fastened with releasable closures to the outside of the pot in such a way as not to impair significantly the natural independent resiliency of the material. Thus, dents in the pot do not generally show in the covering surface because it retains its independent resiliency, even if the blow was delivered through the covering surface. Messages may be changed as often as suits the promotional and decorative needs of the owner of the pot, so the display surface is always timely and in top condition. An optional "window" permits display of interchangeable labels on the inside of the covering. When the display surface is fully removed, the original surface of the pot is substantially restored to its former appearance. Optionally, a protective plastic covering or overlaminant is attached to the print side of the covering material, so that when the printed cover is in its removed state, the printing will not be accidentally damaged by scratching. Some embodiments employ a nylon fabric cover material with promotional printing.

20 Claims, 5 Drawing Sheets

U.S. PATENT DOCUMENTS

| | | | | |
|---|---|---|---|---|
| 4,215,498 | | 8/1980 | Wilson | 40/665 |
| 4,268,567 | | 5/1981 | Harmony | 150/901 X |
| 4,282,279 | * | 8/1981 | Strickland | 150/901 X |
| 4,401,245 | * | 8/1983 | Zills | 215/12.1 X |
| 4,478,265 | * | 10/1984 | DeMarco | 215/13.1 X |
| 4,491,494 | | 1/1985 | Davis, Jr. et al. | 156/240 |
| 4,511,616 | | 4/1985 | Pitts et al. | 40/675 X |
| 4,526,280 | | 7/1985 | Taylor | 215/100.5 |
| 4,583,577 | | 4/1986 | Canfield | 150/52 R |
| 4,727,667 | | 3/1988 | Ingle | 40/306 |
| 4,778,545 | | 10/1988 | Von Derau et al. | 156/64 |
| 4,871,597 | | 10/1989 | Hobson | 215/12.1 X |
| 4,884,704 | | 12/1989 | Spector | 215/12.1 |
| 4,923,557 | | 5/1990 | Dickey | 156/86 |
| 4,955,153 | * | 9/1990 | Albrecht et al. | 40/661 |
| 5,065,879 | | 11/1991 | King | 220/739 |
| 5,078,817 | | 1/1992 | Takagaki | 156/73.1 |
| 5,131,177 | * | 7/1992 | Sy, Jr. | 40/593 |
| 5,169,025 | * | 12/1992 | Guo | 215/12.1 X |
| 5,318,821 | | 6/1994 | Bradley, Jr. | 428/100 |
| 5,322,578 | | 6/1994 | Ogle et al. | 156/64 |
| 5,325,991 | | 7/1994 | Williams | 215/12.1 X |
| 5,358,770 | | 10/1994 | Evans | 40/310 X |
| 5,448,844 | | 9/1995 | Miller, Jr. et al. | 40/611 |
| 5,454,492 | | 10/1995 | Hunter et al. | 222/185.1 |
| 5,609,265 | * | 3/1997 | Haberkorn et al. | 150/901 X |
| 5,622,389 | * | 4/1997 | Courtney | 283/81 |
| 5,676,401 | | 10/1997 | Witkowski | 40/306 X |
| 5,680,944 | * | 10/1997 | Rueter | 215/13.1 |
| 5,704,144 | | 1/1998 | Groth | 40/665 X |
| 5,711,836 | | 1/1998 | Hill | 40/630 X |
| 5,809,867 | * | 9/1998 | Turner et al. | 150/901 X |
| 5,845,804 | * | 12/1998 | Prescott | 215/12.1 X |
| 5,902,659 | * | 5/1999 | Lewin | 283/81 X |
| 5,915,580 | * | 6/1999 | Melk | 215/12.1 X |
| 6,019,540 | * | 2/2000 | Senior | 283/81 X |
| 6,073,796 | * | 6/2000 | Mogil | 215/12.1 X |
| 6,079,316 | * | 6/2000 | Barden et al. | 150/901 X |

\* cited by examiner

REMOVABLE DISPLAY SURFACE

TECHNICAL FIELD

The invention relates to a removable display surface for use as a cover to a beverage container; more particularly, it relates to a removable and precisely measured independently resilient cover for reusable beverage containers with a promotional or advertising message printed on the cover.

BACKGROUND OF THE INVENTION

Many kinds of containers, and particularly beverage containers, are placed in public view, both commercially and privately used, and therefore are appropriate for use as display surfaces for various kinds of advertising and promotion. Commercially, beverage containers are on display containing coffee and other beverages; privately, thermos bottles may be viewed by others while in use, both by way of example. The container wall itself however is ill suited to a display surface as it readily becomes marred and disfigured, and the printing matter itself is degraded, so that any such display is a poor display indeed for the subject matter of the advertisement or promotion. As yet however, no feasible and effective display surface has been proposed which may be attached to these beverage containers or other containers so as to adequately address the needs of current advertising and promotional standards.

In recent years, it has come to be recognized that old style coffee warmers and open coffee pots are not in the best interests of the delicate flavor characteristics of a good brew of coffee. To that end, vacuum pots of various shapes and descriptions have become increasingly popular and prevalent, especially in finer commercial coffee houses and restaurants. Such a pot preserves desirable coffee serving temperature with reduced risk of, and exposure to, either burner heat scorching or air oxidation of the coffee esters. They also generally hold more coffee, and can be made available for use and refills by customers in places that are not wired or not safe for warmer burners.

As mentioned, these pots are often highly visible to the customers and could become effective sign boards for the brand of coffee or any other advertising an owner may wish to display in conjunction with the service of the coffee or other beverage. However, with the passing of time and customer use and normal wear and tear (such as by dish washing operations), the vacuum pots themselves can take on unsightly dents and surface mars.

It has been suggested to permanently adhere a surface covering that is specially cut to fit the covering to the outside of the pot. This covering can hold or display various advertising or promotional messages and graphics. These covering systems however suffer from several disadvantages. Because they are permanently adhered to substantially the entire outside surface of the pot, they in effect become a second skin, and as such lose much if not all of the independent resiliency such a covering material might otherwise inherently have. Any blow or other force striking the skin will be transmitted to the pot as well, and any resulting deformation in the pot surface will also show on the tightly adhered covering skin. Also, if the advertising message becomes stale or otherwise out of date, or if the covering begins to show signs of wear or other distress, it must laboriously be removed in its entirety, leaving the pot covered in unsightly adhesive residue until it is recovered, and this operation must be repeated every time it is desirable to change the advertising message.

Other proposed covering systems require application of a heat shrinkable film to a container, with the disadvantages that such films are not readily, and certainly not non-destructively, removable, and rather less control of the kind and quality of printing that may be imprinted on the film, on its resultant resized surface, is possible compared with unshrunk covers.

Other covering system proposals disclose (1) a foam rubber beverage can insulator with flexible sidewall and bottom member with slits on the bottom for expansion and contraction; (2) a wastebasket, or other open container, cover with a flexible sheet to wrap around the side wall of the basket, and clips to detachably interconnect the top and bottom edges of the sheet to the open rims of the container, and Velcro type closures to hold the ends together; and (3) a loose fitting sock-like covering to fit over standing water cooler bottles and the like, or a free standing cylinder of rigid material resting on the cooler apparatus, with holes or viewing ports to show water level and provide air circulation inside the covering.

What is needed is a feasible and effective display surface which may be attached to beverage containers or other containers so as to adequately address the needs of current advertising and promotional standards. In addition, it would be desirable for such a display surface to be easily and readily removable and to possess independent resiliency (and not be just a second skin tight layer). The desired removable display surface would require only cover end attachment by releasable closures, and would provide an excellent base medium for commercial printing processes.

DISCLOSURE OF THE INVENTION

Accordingly, it is an object of the invention to provide a feasible and effective display surface which may be attached to beverage containers or other containers so as to adequately address the needs of current advertising and promotional standards.

It is a further object of the invention to provide in such a display surface an easily and readily removable wrap around cover.

It is another object of the invention to provide a wrap around cover having independent resiliency.

It is another object of the invention to provide a removable display surface requiring only releasable closures for attachment together of its cover ends.

It is another object of-the invention to provide a removable display surface in turn providing an excellent base medium for commercial printing processes.

It is yet another object of the invention to meet any or all of the needs summarized above.

These and such other objects of the invention as will become evident from the disclosure below are met by the invention disclosed herein.

The invention addresses and overcomes these difficulties by providing a method for making a precisely measured cover for reusable beverage containers. A covering of independently resilient material is precisely cut to fit a given size and shape of pot, and the material has imprinted on it a desired promotional or advertising message and/or graphics. The covering material is removably fastened to the outside of the pot in such a way as not to impair significantly the natural resiliency of the material. For instance, in one embodiment the covering is fastened to the pot by means of temporary fasteners such as Velcro® type hook and pile, magnets, removable tape, or the like. Thus, dents in the pot do not generally show in the covering surface because it retains its independent resiliency, even if the blow was delivered through the covering surface. Messages may be changed as often as suits the promotional and decorative needs of the owner of the pot, 50 the display surface is always timely and in top condition. An optional "window" permits display of interchangeable labels on the inside of the covering. When the display surface is fully removed, the original surface of the pot is substantially restored to its former appearance. Some of the covers are to be transparent or translucent and are to have graphic images back printed on them. Optionally, a protective plastic covering or overlaminant is attached to the print side of the covering material, so that when the printed cover is in its removed state, the printing will not be accidentally damaged by scratching. Some embodiments employ a nylon fabric cover material with promotional printing.

The invention provides a flexible, removably fastened, precisely fitted container cover having a graphical display imprinted on one side of the cover. The graphical display may be advertising or promotional text and/or non-textual graphical images. The flexibility of the container cover material is to facilitate ready application, removal and reapplication of the container cover to the same or different containers, as often as may be necessitated by the need, for instance, to replace a worn or damaged cover, or to provide a different promotional message. By "precisely fitted" is meant that each cover is measured and cut to substantially exactly fit a particular container or identically sized series of containers, where "fitting" means to substantially completely cover the side walls of the container, generally without overlap. In some instances however, some overlap may be advantageously provided for the purpose of providing a fastener mounting surface to facilitate that no fastener parts need be attached in any way to the container itself. It will be appreciated by those skilled in the art that variations of this dimensioning and fitting may be effected to no particular purpose but to avoid the above definition, in which case such variations are to be regarded as within the scope of this invention. Generally, this invention will find application as a covering for beverage containers of the type used to serve coffee in public establishments; however, the invention is not limited to such a particular container.

Some embodiments of the invention will include a transparent window in the cover, through which a "label" may be viewed through the window. A window is preferably a transparent region of the cover on which no graphic display has been imprinted, but may in some embodiments be effected with a separate transparent material sewn in or otherwise assembled into the cover material itself. A "label" can either be an actual label, such as the name of the blend or beverage being dispensed from the container, or it can be any additional supplemental promotional graphical display information. The label is generally disposed over the window in such a way that the graphic material on the label can be viewed through the window, and the label is preferably attached to the window with a removable pressure sensitive adhesive. However, it will be appreciated that any conventional means for holding a piece of material on which can be printed some graphical information, such as an open ended clear envelope attached to one side of the container cover can advantageously be employed to make the label viewable through the window. Preferred embodiments will have the label holder on the inside or rear surface of the container cover where it may readily be accessed by removing the cover, inserting or replacing the label and reattaching the cover. This arrangement will provide both protection for the label, and facilitate integration of the label into the overall graphical design of the cover.

Some embodiments of the invention will be made of a durable, preferably washable, woven fabric such as nylon ripstop or cordura, and the graphical display is generally imprinted on a front surface of the cover material ("front printed"). Such embodiments may be removed for cleaning as well as for replacement to display different promotional messages. This embodiment will also be especially resistive to displaying or revealing any surface imperfections of the container itself, and will be better able to resist impact damage to the cover material itself. Preferred embodiments will have a second, or inner, fabric layer preferably made of a more tightly woven polyester material for additional resiliency and insulating value.

Other embodiments of the invention will be made of a resilient translucent material, such as clear plastic sheet, with the graphical display imprinted on a rear surface of the cover ("back printed") to better protect the printing itself. Various materials may be employed such as printing grades of Lexan® brand plastic sheeting and various vinyl sheet materials and all such plastics as will be known by those skilled in art to take and retain a high quality graphical imprint. It will generally not be necessary to take any special precaution or apply any selection criteria relating to heat shrinkability, or thermal stability, as the covering material will generally be removed from the container prior to exposing the container itself to high temperature washing or sterilization. While thermally unstable material will therefore generally not be preferred, its use will not depart from the scope of the invention.

Some embodiments will also employ an overlaminant layer disposed to cover the graphical display imprinted on the rear surface of the clear plastic sheet. Since some embodiments have no attachment whatever of the cover to the container itself, other than that provided by the relatively tight "wrap" of the cover on the container and the attachment of one edge of the cover to itself, it is anticipated that some sliding of the cover as wrapped around some of the containers will produce some chaffing or wear of the back printed matter, and possibly some discoloration or staining of the surface of the container itself. Even without such sliding, the removal and replacement of the printed covers will leave the printing exposed to possible damage while the cover is off the container. To forestall any such damage to the printing, an overlaminant layer may be advantageously applied over the printing to seal it from such damage. This layer will preferably be laminated to the cover material by methods well known to those in the art, but may also be adhesively adhered to the printed side of the cover material, or attached in any other way as may seem useful to those skilled in the art.

The overlaminant layer may be clear also, but may also be opaque or even metalized (such as for instance a sheet of aluminized mylar) to provide insulation to the container.

The removable fastening of the cover to the container may be effected by one or more releasable closures. A preferred releasable closure is a paired arrangement of hook and pile closures respectively attached to opposite ends of the cover material. They may be disposed as single strips along the end (adjoining) edges of the cover, or as spaced closure tabs along the adjoining edges of the cover. Alternatively, part of the closure pair may be attached to the container itself to forestall sliding of the cover on the container, and the opposite closure type may be attached to one or both ends of the cover for removable fastening of the cover to the container.

Alternatively, the releasable closures may be paired magnetically active materials, such as two compatibly poled magnets, or a magnet and a strip of ferrous material. For ferrous bodied containers, it may only be necessary to provide a magnetic strip, or magnetic tabs (as described above) along adjoining edges of the cover for magnetic attachment of the cover to the container by the magnets. For non-ferrous container, including some stainless steel types, paired magnets, or a magnet and steel strip combination, will be employed and attached to the cover as described above for hook and pile closures for attaching the cover to the container. In some embodiments, at least one part of the pair of magnetic materials is comprised of a magnet strip and the other part of the pair of magnetic materials is a ferrous container surface to which the magnet strip is attracted. In other embodiments, the pair of magnetic materials is comprised of a pair of magnet strips magnetically attracted to each other.

The invention generally provides a removable wrap around container cover of material providing independent resiliency. By "independent resiliency" it is generally meant that the material referred to thusly is capable of sustaining an impact, and even of transmitting that impact through to the underlying container, where the impact might cause surface damage to the container such as a dent, but whereby material is capable of rebounding to or resuming its previous shape resiliently so that the cover material does not betray the damage to the container beneath. One way to achieve or preserve this independent resiliency is to forebear to adhere the cover material in any substantial way to the container itself.

Preferred embodiments of the invention will also have at least one guide slot and tab pair with the tab on one end of the cover and the slot near to, or proximate, the opposite end of the cover and generally aligned with its tab mate in a generally parallel way. A slot is proximate an end of the cover material to the extent that there is generally not more of the cover material between the slot or slots and the end than is useful to preserver the physical integrity of the slots themselves on the one hand, and than is useful to effect a mating layer, for use when an optional adhesive material is provided on the contacting surface of one or both of the slot/tab pair so that the tab(s) and mating layer may both or singly be pressed in the direction of the container to be removably adhered to the cover material to form a secure but removable cover attachment.

BEST MODE OF CARRYING OUT THE INVENTION

Turning now to the drawings, the invention will be described in a preferred embodiment by reference to the numerals of the drawing figures wherein like numbers indicate like parts.

Figure 1:
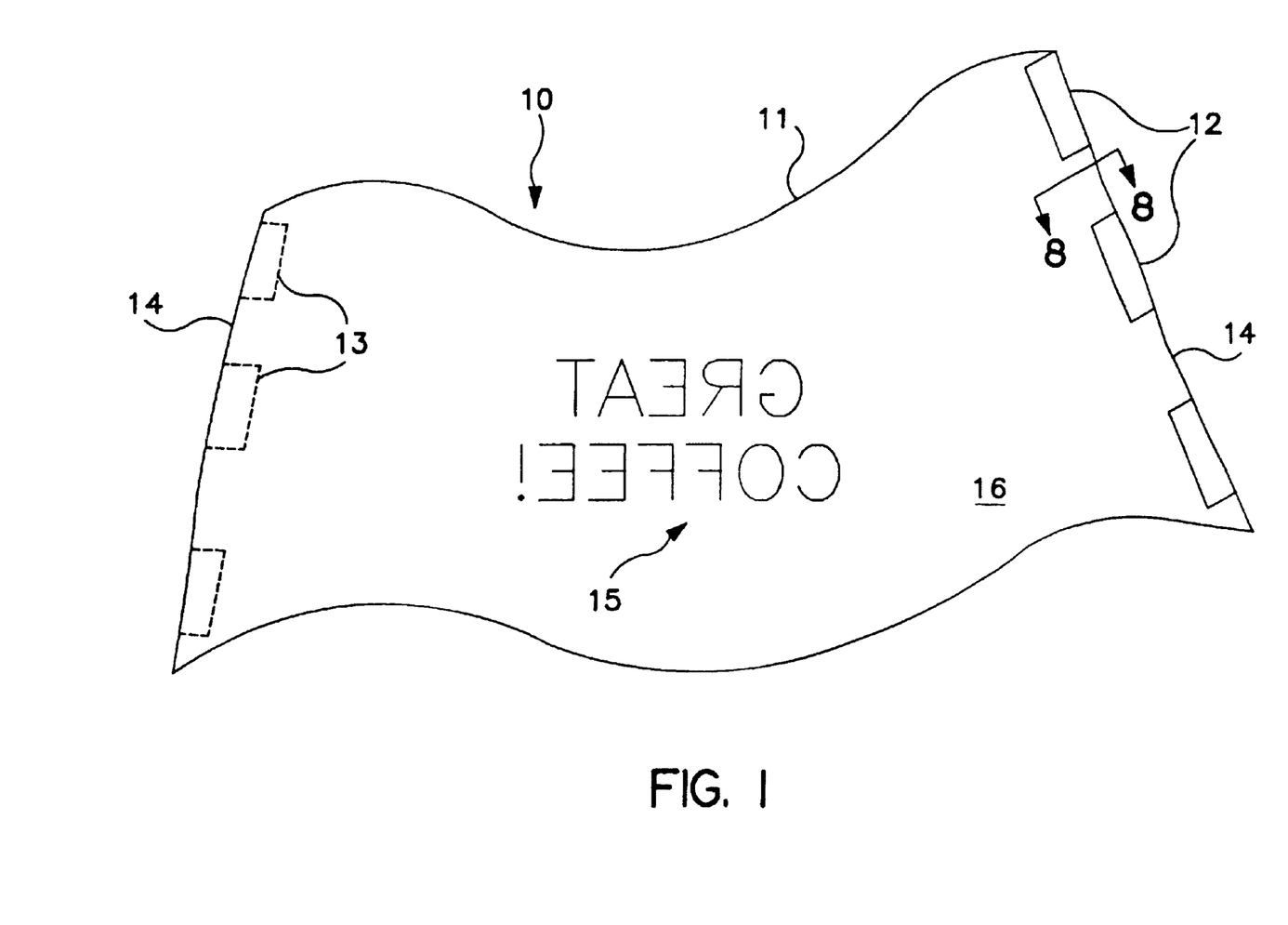
FIG. 1 is a schematic rear plan view of the invention.

In FIG. 1 removable display surface 10 is comprised of independently resilient cover 11 and releasable closure or fastener pairs 12, 13, where fastener half 12 and fastener half 13 are generally matable or detachable halves of a releasable closure system pair, such as for instance a hook and pile type closure or paired magnets. It will be appreciated that in many instances, the halves are interchangeable, which is not to say identical, but rather that part 12 may be either a "hook" strip for instance or a "pile" strip, and vice versa for part 13. In general, one half of the closure will be on one cover end 14 and the other half will be on the other cover end. In the case of hook and pile closures, fastener half 12 will preferably be on the rear surface 16, while fastener half 13 will be disposed on the front surface 17 of cover 11. Thus, as cover 11 is wrapped around container 80 (see FIG. 6), halves 12 and 13 are able to engage each other and removably fasten cover 11 to container 80.

Figure 6:
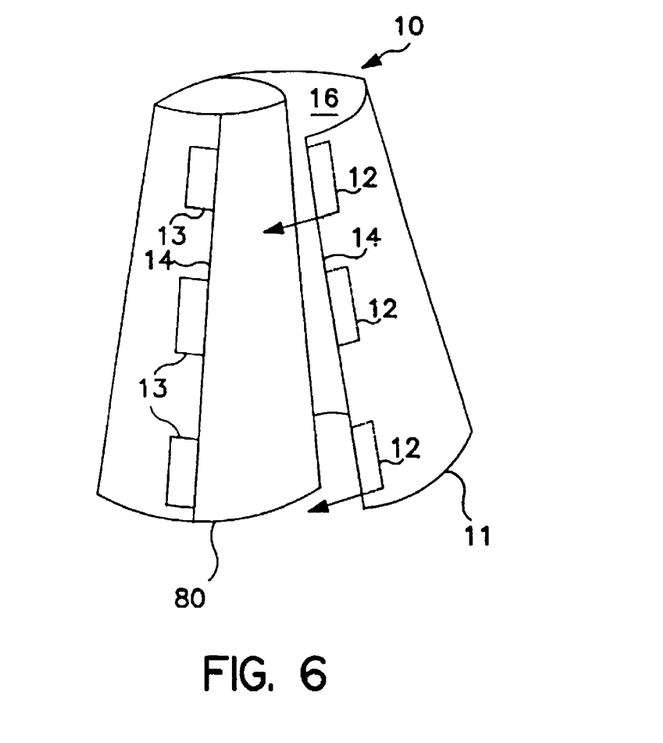
FIG. 6 is a front perspective elevation of the invention.

In this embodiment, though the cover is precisely fitted to its intended container or container series, that fit is accommodated at least in part by a careful overlap of ends 14 to the extent necessary to effect the releasable engagement of fastener halves 12 and 13. It should be noted that halves 12 and 13 are illustrated as groups of separate strips; however, it will be advantageous in some applications to have fastener half 12 be a single long strip covering substantially the width of cover end 14, and the same will be true for fastener half 13. Where a plurality of strips is employed, the respective mating opposite pair halves will be aligned so that, upon mating engagement, the cover is closed without appreciable skew in the mating of cover ends 14; that is, a cover 11 cut to cover a cylindrical container, for example, will close into a cylindrical shape, with ends 14 overlapping (where such overlap is required by the nature of the fastener) and more or less congruent. In FIG. 6, display surface 10 is wrapped around container 80 so that fastener halves 12 and 13 engage their respective mates in the direction indicated by the arrows after cover ends 14 overlap.

Figure 2:
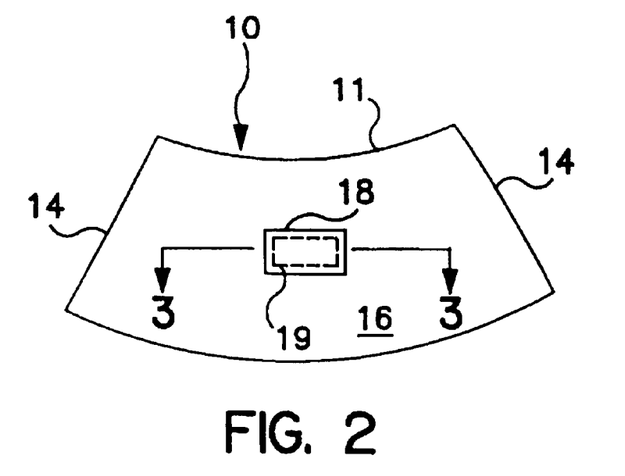
FIG. 2 is a schematic rear plan view of an alternate embodiment of the invention.

The cut of cover 11 is also effected to accommodate the shape of the intended container, whether it be cylindrical or frusto-conical or other shape. Both FIG. 1 and FIG. 2 illustrate covers cut to accommodate a frusto-conical container. In FIG. 1, the pronounced "waviness" of the top and bottom edges of cover 11 are intended to illustrate the relatively more flexible nature of the woven fabric embodiment, as opposed to the relatively more rigid plastic sheet embodiment of FIG. 2. However, the aspect of back printing of graphical message 15 onto the rear surface 16 of cover 11 is arbitrarily illustrated in FIG. 1, notwithstanding that fabric embodiments of the invention will generally not be translucent to any appreciable extent and will rather be front printed. By the same token, the "window" aspect of the invention illustrated in FIG. 2 by window 19 and label 18 may be advantageously employed in either the sheet or fabric embodiments of the invention, though illustrated arbitrarily only in FIG. 2.

Figure 12:
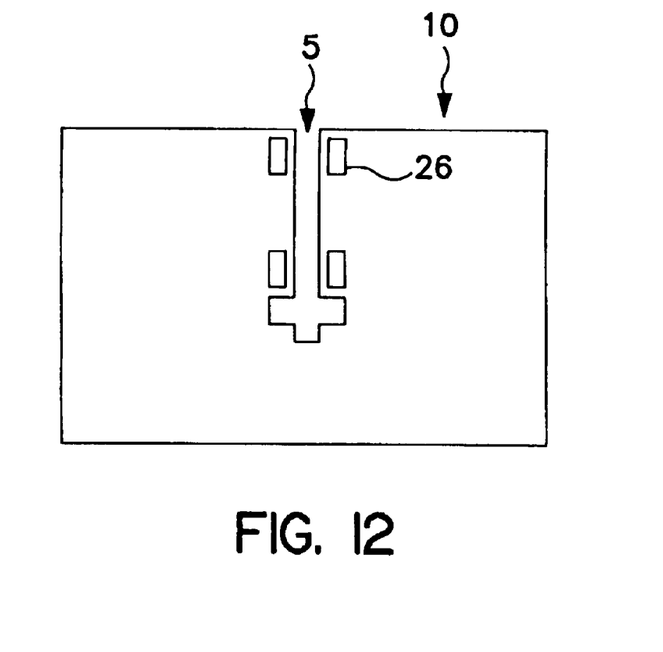

FIG. 12 illustrates a typical accommodation in the precise fit of cover 11 for its container. In the example case of a beverage container/dispenser having a conventional glass fill gauge and a pour spigot beneath, cover 11 is relieved by cut out 5 so that display surface 10 covers all of the sidewall surface of the container. Optional hook or pile fastener halves 26 are appropriately placed to mate with corresponding and respective pile or hook fastener halves affixed to the container itself.

Figure 8:
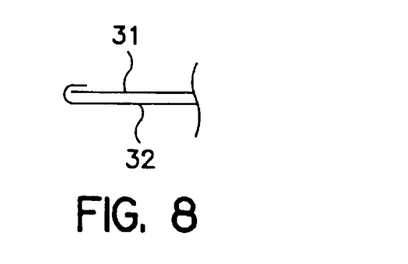
FIG. 8 is a partial schematic cross section taken along line 8—8 of FIG. 1.

FIG. 8 illustrates and alternative construction for cover 11 in FIG. 1. Instead of one layer of fabric in cover 11, two layers are sewn together: inner layer 31 and outer layer 32. Preferred outer layer (also preferred in there is only one layer) material is style 2020 200 denier ripstop nylon; inner layer material is preferably style 6000 600 denier polyester fabric.

Figure 3:
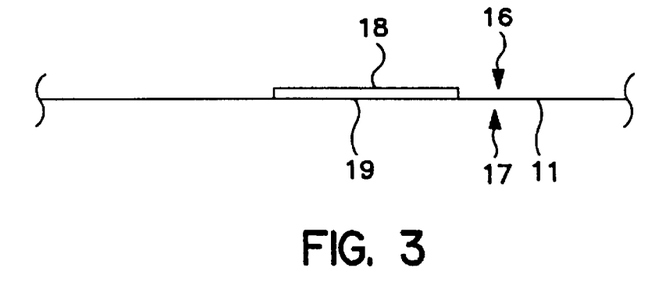
FIG. 3 is a partial cross section of the invention taken at line 3—3 of FIG. 2.

In FIG. 2 a plastic sheet embodiment of the invention is illustrated. General Electric Lexan® brand plastic film is preferred in this embodiment, though printing grades of vinyl sheeting may also be made to serve. For the sake of simplicity of illustration, closure halves 12 and 13 are not shown; however, it is to be understood that the releasable fasteners described in reference to FIG. 1, or their equivalents, may be employed in any other embodiment, whether illustrated or not. Label 18 is preferably disposed on or over transparent window 19 in cover 11 so that a message (not shown) on label 18 disposed on the rear surface 16 of cover 11 may be viewed through window 19 from the front surface 17 of cover 11. This arrangement is shown in partial cross section in FIG. 3.

Label 18 is preferably attached to the rear surface 16 of cover 11 and over or behind window 19 with a pressure sensitive removable adhesive so that labels of differing message content may be interchangeably disposed behind window 19 from time to time without damage to cover 11 and without need for alternative label attaching means. Alternative label attaching means may however be employed without departing from the scope of the invention. Mounting label 18 behind window 19 provides the protection of a covering window to the various labels that may be placed behind any particular window. In practice, it will be a simple matter to open cover 11, remove a label, and replace it with a new label. It has been found that Flexcon (Seattle, Washington) V400 frosty clear V68 removable pressure sensitive adhesive adequately adheres label 18 to any part of rear surface 16, including window 19, while providing ease of removal of label 18 when it is time for replacement. Preferred label material is Flexcon 90 PFW vinyl.

Figure 4A:
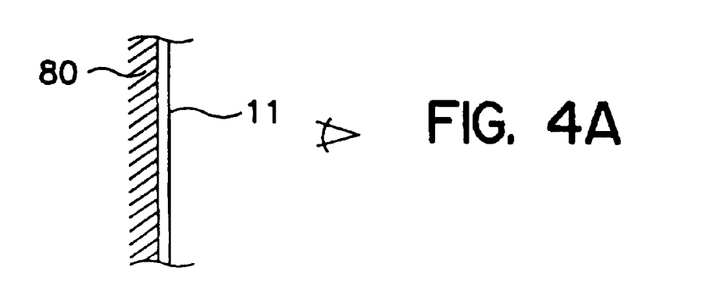
FIGS. 4a–c is a schematic partial cross section of the invention.
Figure 4B:
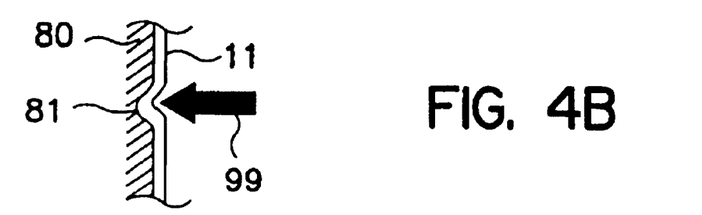
Figure 4C:
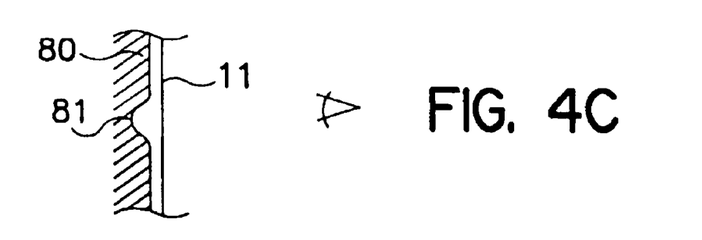

FIGS. 4a–c schematically illustrate the quality of independent resiliency of the invention. In FIG. 4a container wall 80 is obscured by cover 11. The cover appears smooth and unbroken to the viewer. In FIG. 4b an impact force 99 strikes both cover 11 and, through it, to container wall 80, causing a dent 81. If cover 11 were permanently adhered, or even adhered at all to wall 80, dent 81 would show to some extent in cover 11. This would also be true in other conventional covering systems. But in FIG. 4c, cover 11 appears much as it did before the impact of force 99, thus obscuring dent 81 and other surface imperfections in container wall 80. This might not hold true for forces and impacts from sharp objects whose effect is to cut or tear cover 11, but for most relatively dull impact forces short of those tending to destroy the container itself, cover 11 will merely transmit such forces, not be changed by them.

Figure 5:
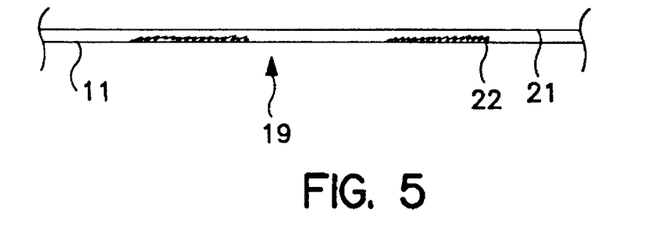
FIG. 5 is a partial cross section of an alternate embodiment of the invention.

In FIG. 5, an alternate embodiment of the sheet plastic embodiment is illustrated in schematic partial cross section. Cover 11 is back printed with ink 22, except in the region of window 19. Over the ink layer is preferably disposed overlaminant 21. Overlaminant 21 provides enhanced resiliency to cover 11 and protects ink 22 from abrasion against container 80 and from accidental damage while cover 11 is removed, as for example when the container is being washed. For embodiments not employing an overlaminant, conventional UV hardening inks may be employed, and if protection from abrasion is desired without using an overlaminant, then an air cure texture coat of Deco-Chem 7030 abrasion matt small text may be applied to the back of the back printed graphic ink layer.

In the case of overlaminant, conventional inks are preferred, as it has been noted that UV inks tend to release to the overlaminant and cause flaws or bubbles to appear from the front of the cover. Preferred overlaminant material is Flexcon Flextwin MM-200 white/white metalized mylar adhered to the cover sheet layer with TC-249, V-29, 1504-9 adhesives or their equivalent. These adhesives provide a white backing layer to obviate the need otherwise for a white coat behind the graphic display ink. Alternatively, vinyl sheeting may also be used for the overlaminant layer.

Figure 10:
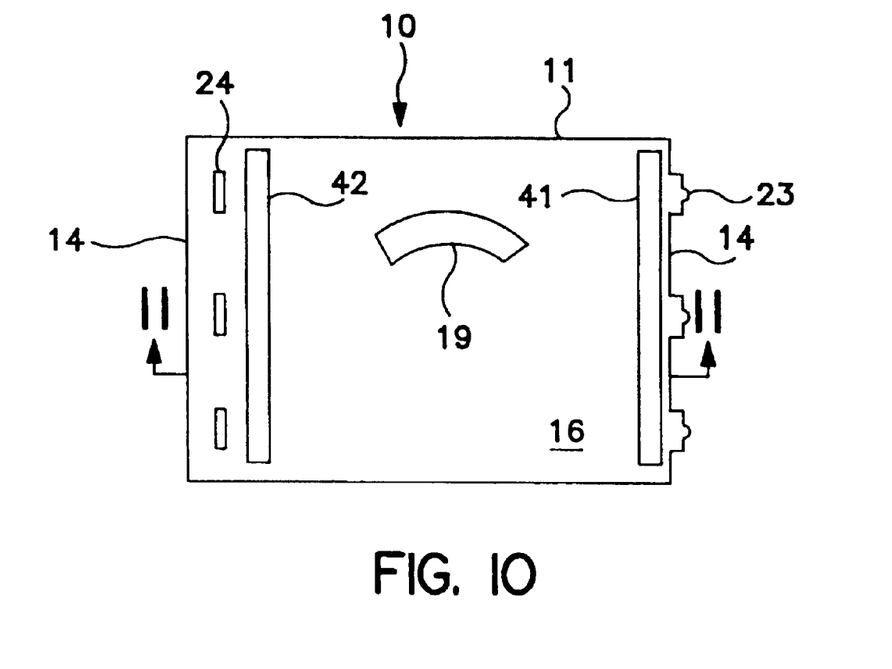
FIG. 10 is a schematic rear plan view of an alternate embodiment of the invention.

FIG. 10 shows an alternate configuration of the invention. Curved window 19 is set amid cover 11 of display surface 10. Preferred magnetic closures 41 and 42 in the form of cover end width rubberized magnetic strips are adhered to the rear surface 16 of cover 11 proximate the respective cover ends 14. In some embodiments (not shown), magnetic strips 41 and 42 lie at or very near the cover ends and the cover is wrapped around a container having ferrous material walls so that the magnets adhere magnetically to the container walls, and the fitted cover 11 fits precisely around the container without overlap, the magnets maintaining both closure of the seam whereat the two cover ends meet, but also thereby holding the cover to the container. This configuration is advantageous for ferrous bodied containers. For non-ferrous bodies and some types of stainless steel, it is desirable for the magnet pair to be disposed for mating engagement with each other through self adherence.

As these arrangement will sometimes permit slippage of cover 11 both with respect to its grip on container 80 and also with respect to its own precise, unskewed alignment of its cover ends 14, especially in smooth or relatively featureless containers, the embodiment illustrated in FIG. 10 is preferred. In this embodiment, alignment tabs 23 and slots 24 are provided. Some overlap is provided to effect the engagement of respective corresponding slots and tabs, and the positioning of the magnets 41 and 42 is adjusted, with magnet 41 near the tab end of the cover being preferably quite close to, but not overlapping, the tabs, and with magnet 42 being inside the line of slots 24, rather than being so close to the other end 14 of cover 11, as shown. In this configuration, as cover 11 is wrapped around its container (such as is shown in FIG. 6), tabs 23 come into engagement with and through slots 24, thereby assuring complete and correct alignment of ends 14; at the same time the magnets 41 and 42 adhere to container 80 and releasably hold cover 11 to the container.

Figure 11:
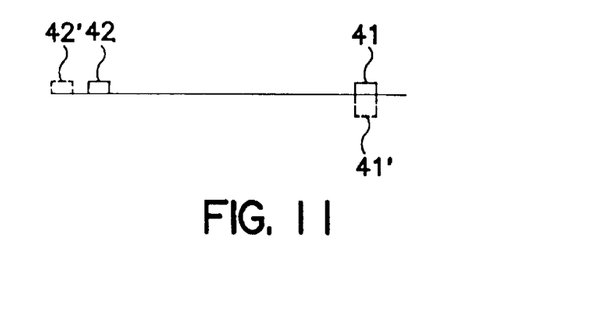
FIG. 11 is a cross section taken along line 11—11 of FIG. 10.

FIG. 11 shows a schematic cross section for the preferred placement of magnets 41 and 42. As they are intended to adhere, not to each other, but to the container, they are place on the same (inner) side of cover 11. As an alternate arrangement, providing for magnet-to-magnet engagement, magnets 41' and 42' are shown positioned on opposite sides of cover 11, and with magnet 42' shifted relative to the position of magnet 42 to be more proximate the cover end 14, where magnet 42' is disposed between the cover end 14 and the line of slots 24, so that, with appropriate overlap of cover ends 14, magnet 41' may engage magnet 42' when cover 11 is wrapped around its container. Tabs 23 have a roughly pointed and stepped design to facilitate insertion into slots 24.

Figure 7:
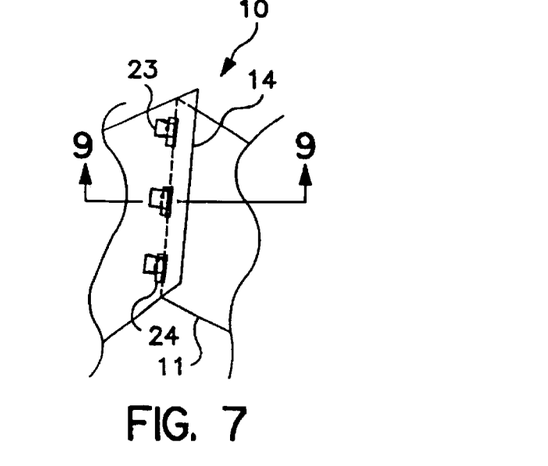
FIG. 7 is a partial perspective view of an aspect of the assembly of the invention.
Figure 9:
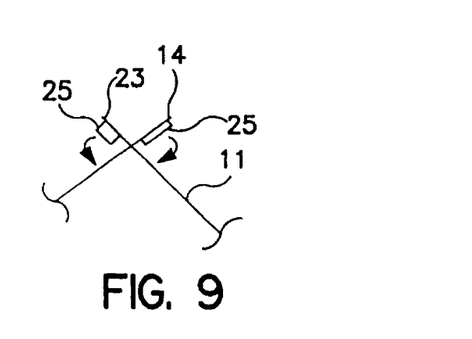
FIG. 9 is a partial schematic cross section taken along line 9—9 of FIG. 7.

FIGS. 7 and 9 illustrate a variation on the guide tab and slot configuration of FIG. 10; FIG. 7 also shows the wrapped engagement of tabs 23 into slots 24. The alternate embodiment requires no hook an pile or magnet fasteners, but rather relies on the application of removable pressure sensitive adhesive 25 to the underside of tabs 23 and to the flap end of cover end 14 that lies between the cover end and the line of slots 24. After tabs 23 are fully inserted into slots 24, adhesive 25 is activated if required (such as by removing any protective non adhesive strip or strips), and the tabs and the flap end are all pressed inward (in the direction shown by the arrows) against wrapped cover 11 to securely, but releasably fasten cover 11 around container 80. This configuration is particularly well suited to wrap covers for children's containers which must endure rugged usage, such as thermoses.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

A feasible and effective display surface which may be attached to publicly placed beverage containers or other containers is needed to adequately address the needs of current advertising and promotional standards. Such a display surface is most valuable if it is easily and readily removable and possesses independent resiliency. Advertising may be changed often, and the owner of the containers is never embarrassed at the physical condition of the containers themselves, covered as they are by the display surface.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A container cover comprising a flexible sheet with a graphical display imprinted thereon, and a cover fastener whereby the cover may be removed from a container, and further wherein the sheet is adapted to substantially cover the side walls of a container, the apparatus further comprising a window that is transparent through the cover, and a label disposed on said window to be viewed through the window.

2. The cover of claim 1, wherein the container cover is comprised of a woven fabric and the graphical display is imprinted on a front surface thereof.

3. The cover of claim 2 further comprising a second fabric layer.

4. The cover of claim 1 wherein the container cover is comprised of a resilient translucent material.

5. The cover of claim 4 wherein the resilient material is a clear plastic sheet, and the graphical display is imprinted on a rear surface thereof.

6. The cover of claim 5 further comprising an overlaminant layer disposed to cover the graphical display imprinted on the rear surface of the clear plastic sheet.

7. The cover of claim 6 wherein the overlaminant layer is metalized to provide insulation to the container.

8. A container cover comprising a flexible sheet with a graphical display imprinted thereon, and a cover fastener whereby the cover may be removed from a container, wherein the fastener comprises one or more releasable closures, and further wherein the sheet is adapted to substantially cover the side walls of a container, and wherein the releasable closures are comprised of at least one pair of magnetically active materials.

9. The cover of claim 8 wherein at least one part of the pair of magnetic materials is comprised of a magnet strip and the other part of the pair of magnetic materials is a ferrous container surface to which the magnet strip is attracted.

10. The cover of claim 8 wherein the pair of magnetic materials is comprised of a pair of magnet strips magnetically attracted to each other.

11. The cover of claim 8 further comprising at least one guide slot and tab pair wherein the tab is on one end of the cover and the slot is proximate the opposite end of the cover and parallel to the tab.

12. The cover of claim 11 further comprising adhesive material on the contacting surface of at least one part of the slot/tab pair.

13. The cover of claim 12 wherein the adhesive material is of the removable type.

14. A flexible, removably fastened, precisely fitted container cover having a graphical display imprinted on a rear surface thereof, wherein the container cover is comprised of a resilient translucent plastic sheet, and further comprising a transparent window and a label disposed over the window so that it may be viewed through the window, and further comprising one or more releasable closures where each closure is further comprised of at least one pair of magnetically active materials, and wherein the cover is removably fastenable to a container with the closures.

15. A container cover comprising a flexible sheet with a graphical display imprinted thereon, and a cover fastener for removably fastening the cover to a container, the fastener comprising one or more releasable closures, the releasable closures comprising at least one pair of magnetically active materials, and further wherein the sheet is adapted to substantially cover the side walls of the container.

16. The cover of claim 15 wherein at least one part of the pair of magnetic materials is comprised of a magnet strip and the other part of the pair of magnetic materials is a ferrous container surface to which the magnet strip is attracted.

17. The cover of claim 15 wherein the pair of magnetic materials is comprised of a pair of magnet strips magnetically attracted to each other.

18. The cover of claim 15 further comprising at least one guide slot and tab pair wherein the tab is on one end of the cover and the slot is proximate the opposite end of the cover and parallel to the tab.

19. The cover of claim 18 further comprising adhesive material on the contacting surface of at least one part of the slot/tab pair.

20. The cover of claim 19 wherein the adhesive material is of the removable type.

* * * * *